United States Patent [19]
Ango

[11] 3,896,901
[45] July 29, 1975

[54] AUTOMATIC CHAIN LUBRICATOR FOR MOTORCYCLES AND THE LIKE

[76] Inventor: Alvino J. Ango, 1252 Elliot, Madison Heights, Mich. 48071

[22] Filed: Feb. 21, 1974

[21] Appl. No.: 444,527

[52] U.S. Cl............................ 184/15 R; 123/196 R
[51] Int. Cl.² ............................................ F16N 7/30
[58] Field of Search ................. 184/15 B, 65, 15 R; 222/523, 525; 123/196 R; 60/309

[56] References Cited
UNITED STATES PATENTS

| | | | |
|---|---|---|---|
| 508,485 | 11/1893 | Mowrer et al. .................. | 184/15 R |
| 3,012,632 | 12/1961 | Bradley ............................ | 184/15 R |

*Primary Examiner*—Richard C. Pinkham
*Assistant Examiner*—William R. Browne
*Attorney, Agent, or Firm*—Edwin W. Uren

[57] ABSTRACT

In a machine such as a motorcycle wherein a two cycle gasoline engine is drivably coupled to a rotatable output member by a pair of chain connected sprockets, and wherein the drive chain connecting the sprockets requires regular and periodic lubrication to assure optimized efficiency in operation and prolonged life of the chain, an emissions collector is provided in association with the exhaust pipe of the engine to collect a portion of the combustion emissions generated thereby, such collected emissions being directed by a diverter to the drive chain such that the residual of oil forming a part of the emissions is applied continuously to the chain during operation of the machine to thereby maintain a protective, wear-preventing coating of lubricant thereon.

26 Claims, 6 Drawing Figures

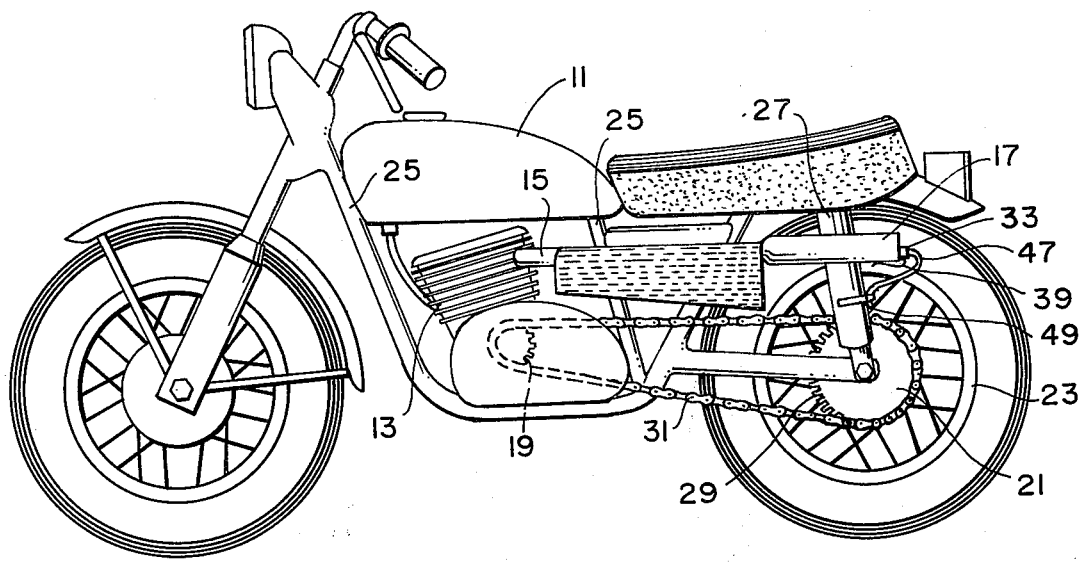
FIG. 1
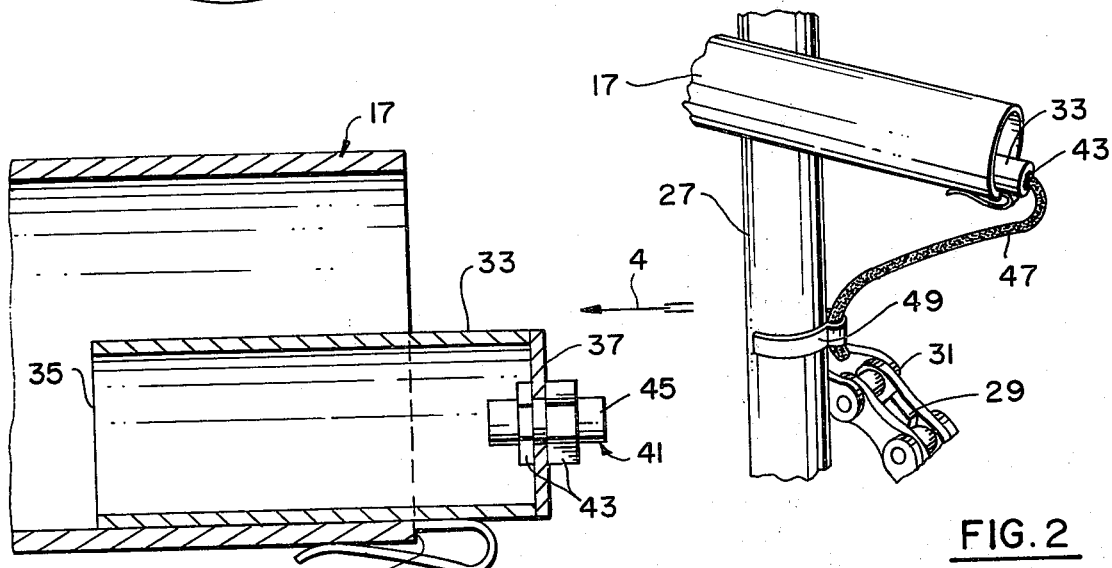
FIG. 2
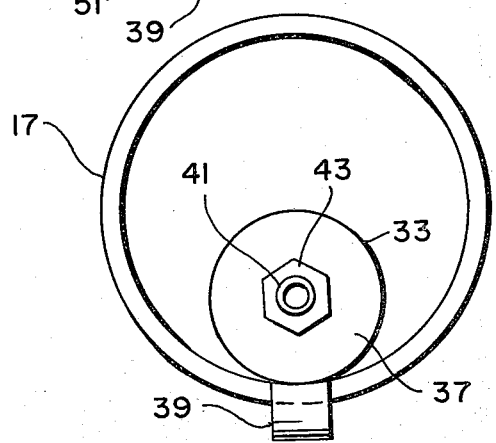
FIG. 3
FIG. 4

3,896,901

AUTOMATIC CHAIN LUBRICATOR FOR MOTORCYCLES AND THE LIKE

BACKGROUND OF THE INVENTION

One of the characteristics of chain driven vehicles such as motorcycles is that their efficient operation is largely dependent upon the condition of the drive chain and the driving and driven sprockets connected thereby, efficiency in operation requiring that the chain and sprockets be properly lubricated, and maintained in a wear-free state. Maintenance of the chain and sprockets in this desirable state requires not only that the chain be frequently and regularly lubricated, but that it be periodically cleaned of dust and dirt particles that tend to adhereably collect on the chain and to be distributed to the teeth of the sprockets during normal functioning of the vehicle. Accumulations of dust and dirt particles on the chain and sprockets tend to produce wear to both the chain and the sprockets, the initial effect of such wear causing a whipping action of the chain as it rotates around the sprockets, with an end result of breakage of the chain and damage to the sprockets should the wear be permitted to continue unabated.

To prevent such wear from occurring, it has heretofore been necessary to frequently and regularly clean and relubricate the chain and the teeth of the sprockets, a preventive maintenance type attention which requires that the chain be removed from the sprockets, that the sprockets be cleaned of dust and dirt particles, that the chain be cleaned by agitated emersion in a cleaning solvent such as gasoline, and then relubricated, and finally that the chain be reassembled on the teeth of the sprockets. A commercially available prepared solvent solution such as "Chain Lube" is commonly used in this cleaning and relubricating process, such solution being obtainable in aerosol cans that provide six or seven applications.

Contributing to the inconvenience of the above described preventive maintenance is the frequency with which such attention is required, according to the particular usage that is made of the vehicle or motorcycle. It has been established that cleaning and relubricating of the chain and sprockets of a motorcycle are required after approximately 300 miles of road usage, and more frequently during trail usage depending upon the dust content of the environment in which the trail usage occurs. Under extremely dusty environments, such as in hill climbs, cleaning and relubricating attention may be required after each usage.

It will be apparent from the following description that the present invention will find particular application in connection with motorcycles and other chain driven vehicles that employ two cycle gasoline engines as a source of motive power, representing approximately 50 percent of the motorcycles currently being marketed. As is well known in the art, two cycle combustion engines require a mixture of oil with the gasoline fuel supply in order that a coating of protective lubricant may be continuously deposited on the walls of the engine cylinders. Early model two cycle engines require the physical mixture of the oil with the gasoline in a single fuel tank, while later models provide separate tanks for the oil and the gasoline which are proportionately injected into the cylinders prior to compression build up. Regardless of the manner of mixing the oil with the gasoline, a proportioned mixture of the two is always present in the cylinders prior to piston firing.

In addition to the fuel mixture characteristic of known two cycle engines, such engines are normally operated at a speed of from 6,000 to 9,000 revolutions per minute, and invariably generate combustion emissions that contain an appreciable residual of oil, the emissions with an oil residual being expelled with considerable force by reason of the RPM speed of the engine.

SUMMARY OF THE INVENTION

With the above described characteristics of two cycle gasoline engines in view, along with the described tendency of drive chains and sprockets to wear if not properly cleaned and lubricated, it is an object of the present invention to provide means attachable to motorcycles and the like for collecting a portion of the combustion emissions expelled by the engine, and means for directing the collected emissions onto the drive chain such that the residual of oil contained therein may be applied to the chain and the sprockets and to thereby maintain these critical parts in a fully lubricated state.

It is a further object of the present invention to provide a two cycle motorcycle or other vehicle with emission collecting and diverting means that is effective for communicating the expelling force of the emissions to the drive chain of the vehicle as a continuous blowing force, the effect of such blowing force being the continuous dislodgment of dust and dirt particles that tend to collect on the chain during normal operation of the vehicle.

An important aspect of the present invention is the provision of an emissions collector that is attachably secured to the exhaust pipe of a motorcycle or other two cycle, chain-driven vehicle, such emissions collector serving to capture and to collect a portion of the combustion emissions that are forcibly expelled by the engine.

Another important aspect of the invention is the provision of an emissions diverter that is coupled at one end to the outermost extremity of the emissions collector, and attachably supported at the other end by the frame structure of the vehicle such that the emissions collected by the emissions collector are forcibly directed upon the moving surface of the chain.

BRIEF DESCRIPTION OF THE DRAWING

These and other objects, aspects and advantages of the invention will become apparent from the following description when read in conjunction with the following drawing figures wherein:

FIG. 1 is an elevational view of a typical motorcycle to which the present invention is applicable;

FIG. 2 is a perspective view showing a first embodiment of the invention wherein an element thereof is inserted into the hollow tail pipe of the motorcycle;

FIG. 3 is an enlarged fragmentary elevational view of the embodiment of FIG. 2;

FIG. 4 is a view of the FIG. 2 embodiment taken in the direction of the arrow 4 in FIG. 3;

DESCRIPTION OF THE PREFERRED EMBODIMENT

Figure 5:
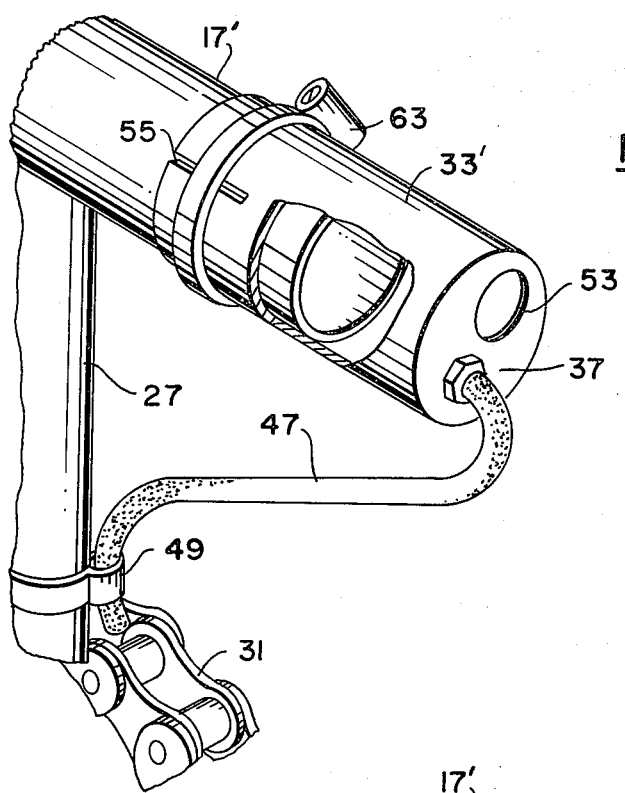
FIG. 5 is a perspective view showing a second embodiment of the invention adapted to suit the requirements of motorcycles that are equipped with baffled or small diametered tail pipes.

The invention resides in the provision of means for collecting a portion of the combustion emissions that are generated by a two cycle gasoline engine of a motorcycle or the like and forcibly expelled through an exhaust pipe thereof, such means being communicably coupled to the exhaust pipe and coupled also to flexible diverter means formably connected to the frame structure of the motorcycle, the emissions collected by the collector means being thereby forcibly directed upon the rotating surface of the drive chain of the motorcycle.

As shown in FIG. 1, two cycle engine motorcycles commonly provide a single fuel tank 11 in which both oil and gasoline are proportionately mixed, a two cycle engine 13, an exhaust pipe 15 terminating in a tail pipe 17, a driving sprocket 19 responsive to the operation of the engine, and a driven sprocket 21 that is coupled to the rear wheel 23 of the motorcycle. The assembled engine 13, driving sprocket 19 and exhaust pipe 15 are supported in a position underneath the single tank 11 by a plurality of frame members 25, and the rear wheel 23 and driven sprocket 21 are rotatably supported by a pair of spaced apart frame members 27 (only one of which is shown). The tail pipe 17 is supported by the leftmost of the frame members 27. The driving sprocket 19 and driven sprocket 21 are each provided with peripheral teeth 29 which are engaged by roller supporting links of a drive chain 31 which operably connects the sprockets. It is to the automatic and continuous cleaning and relubrication of the drive chain 31 that the present invention is particularly directed, the simple installation of the hereinafter described invention to a two cycle engine motorcycle or other chain driven vehicle serving to eliminate the need of periodically and frequently cleaning and relubricating the drive chain according to the heretofore required and above described cumbersome process.

Figure 6:
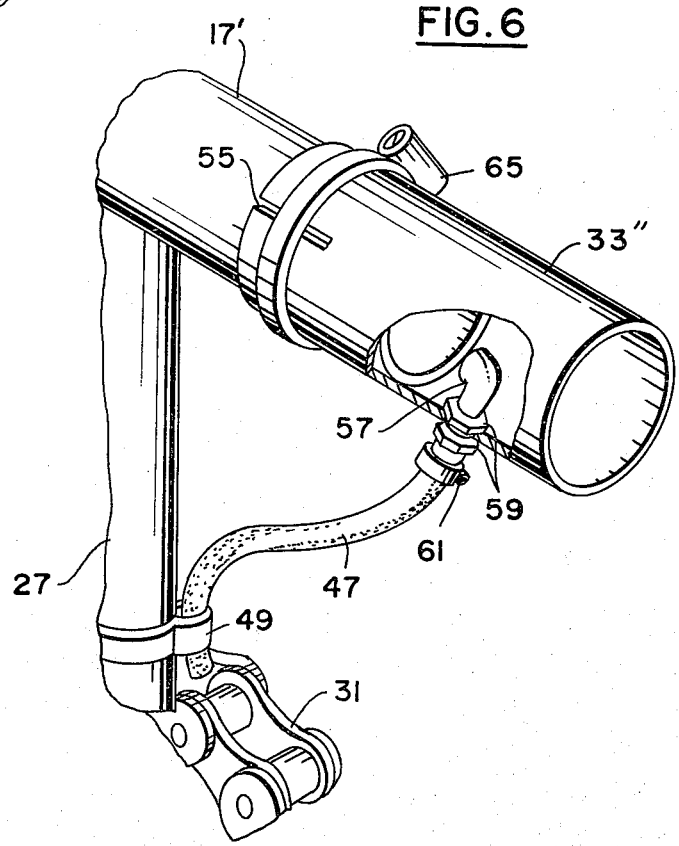
FIG. 6 is a perspective view showing a third embodiment of the invention which is also adapted to suit the requirements of motorcycles with baffled or small diametered tail pipes.

A first embodiment of the present invention, as illustrated in FIGS. 2, 3 and 4, is particularly adapted to motorcycles and the like that are provided with hollow tail pipes 17 of relatively large diameter, and a second and third embodiment, as illustrated in FIGS. 5 and 6, respectively, are particularly adapted to motorcycles that are provided with tail pipes 17' of either relatively small diameter or with baffled interiors. The first embodiment of FIGS. 2 and 3 is comprised of a cylindrical collector 33 having an open forward end 35, a closure member 37 disposed at the opposite end, and a resilient clip 39 affixed to the exterior surface thereof. The closure member 37 is provided with an aperture into which a hollow coupling 41 is fitted and secured to the closure member by a pair of nuts 43. An outwardly extending and unthreaded portion 45 of the hollow coupling 41 provides a mating fit with one end of a flexible diverter 47, as best shown in FIG. 2, the other end of the diverter 47 being connected to a frame member 27 by means of a retaining clamp 49. The diverter 47 may be made of any flexible durable material such as neoprene, or pliable metal tubing may be used, along with appropriate precautions that would avoid dislodgment of the diverter and possible damage to the spokes of the motorcycle wheel. In the event a pliable metal tube is used, the end thereof attached to the collector 33 should be secured to the extended portion 45 of the coupling 41 with a suitable pressure clamp, and the retaining clamp 49 connecting the free end of the diverter 47 to the frame member 27 should be sufficiently strong and durable to withstand the normal vibrations produced by motorcycle usage.

The second embodiment of FIG. 5, in addition to the diverter 47, coupling 41 and closure member 37 utilized in the above described embodiment illustrated in FIGS. 2 and 3, is comprised of a cylindrical collector 33' of greater diameter than the diameter of the tail pipe 17', and having an exhaust aperture 53 formed in its closure member 37 contiguous to the coupling 41, and a pair of oppositely disposed slots 55 axially formed in the extremity thereof opposite the extremity provided with the closure member 37, the larger diameter of the collector 33' relative to the tail pipe 17' permitting slidable installation of the collector 33' over the tail pipe 17' such that a portion of the emissions are directed through the coupling 41 to the diverter 47 and the remainder of the emissions are permitted to escape through the exhaust aperture 53. The third embodiment of FIG. 6 is comprised of an open-ended cylindrical collector 33'' which is also provided with a pair of oppositely disposed slots 55 axially formed in one extremity thereof, such collector 33'' also being of greater diameter than the diameter of the tail pipe 17', and being additionally equipped with a threaded and interiorly disposed emissions collecting elbow 57 which is located in an aperture of and secured to the peripheral wall of the collector 33'' by a pair of nuts 59, the diverter 47 being coupled to an unthreaded exteriorly disposed extension of the elbow 57 by means of an adjustable clamp 61.

To install the automatic chain lubricator on a motorcycle having a non-baffled tail pipe 17 of relatively large diameter, as illustrated in FIG. 1, the cylindrical collector 33 of the FIGS. 2 and 3 embodiment would be inserted into the outboard extremity of the tail pipe 17 such that the open forward end 35 of the collector is disposed in the direction of the engine 13, and with the resilient clip 39 disposed in clampable relationship relative to the exterior peripheral surface of the tail pipe 17. The extremity of the resilient clip 39 secured to the collector 33 may serve as a positioning limit stop, as indicated at 51 in FIG. 3, or one or more separate limit stops may be provided on the exterior surface of the collector 33 for restricting the insertion of the collector 33 into the open end of the tail pipe. With one end of the flexible diverter 47 snuggly fitted over the unthreaded portion 45 of the hollow coupling 41, the opposite end of the diverter 47 would then be securely connected to the frame member 27 by means of the retaining clamp 49.

To install the FIG. 5 embodiment of the inventive automatic chain lubricator on a motorcycle having a tail pipe 17' of relatively small diameter or baffled interior, the emissions collector 33' would be slidably installed over the end of the tail pipe 17' and secured thereto by an adjustable clamp 63 positioned in the area of the slots 55, said slots permitting responsive contraction of the collector 33' to establish a secure gripping relationship with the tail pipe. The diverter 47 connected to the coupling 41 (FIG. 3) would then be connected to the frame member 27 in like manner to that described in connection with the embodiment of FIGS. 2 and 3. To install the FIG. 6 embodiment of the chain lubricator on a motorcycle having a tail pipe 17' of relatively small diameter or baffled interior, the emissions collector 33" would be slidably installed over the end of the tail pipe 17' and secured thereto by an adjustable clamp 65 positioned in the area of the slots 55, said slots, as above indicated, permitting responsive contraction of the collector 33" to establish a secure gripping relationship with the tail pipe. The diverter 47 connected to the exteriorly disposed extension of the elbow 57 would then be connected to the frame member 27 in the manner common to all three embodiments and described above in connection with the FIG. 2 embodiment.

With the emissions collector 33, 33' or 33" attached to the tail pipe 17 or 17' of the motorcycle and the flexible diverter 47 secured to the frame member 27 as described, operation of the motorcycle would result in the collection of a portion of the combustion emissions generated by the engine 13 and forcibly expelled through the exhaust pipe 15 and tail pipe 17 or 17', the collected emissions being forcibly directed by the diverter 47 onto the rotating surface of the drive chain 31, the effect of the forcibly applied emissions being to dislodge dust and dirt particles that are deposited on the chain and to continuously apply the residual of oil of the emissions to the chain in an automatic and continuous lubricating process.

Although three embodiments of the inventive automatic chain lubricator have been described in considerable detail, it is to be understood that various changes and modifications in the structures thereof may be effectuated by those skilled in the art without departing from the true spirit and scope of the invention.

What I claim is:

1. In a mobile unit having a frame structure, at least one drive wheel, a first sprocket associated with said drive wheel, a two cycle gasoline engine for drivably rotating a second sprocket, an endless drive chain coupling said first sprocket and said second sprocket, and an engine exhaust member for accommodating the forcible expelling of the combustion emissions generated by said engine during the operation of said vehicle, said emissions including a residual of oil, the improvement comprising:
   a. a collector means communicably coupled to said engine exhaust member so that a portion of the forcibly expelled emissions is captively collected thereby during the operation of said engine, and
   b. a diverter means coupled to said collector means and to said frame structure and effective for directing said captively collected forcibly expelled emissions onto said endless drive chain such that dust and dirt particles that may have collected thereon are displaced therefrom and the residual of oil forming a part of said emissions is distributed therealong as said chain and said first and second sprockets are drivably rotated by said engine, whereby said chain is maintained in a dirt-free condition and the residual of oil of said emissions is applied to the chain and to the sprockets as a protective and wear-preventing coating.

2. The improvement defined in claim 1 wherein a part of said engine exhaust member is a tail pipe leading therefrom and away from said engine, and wherein said collector means comprises an elongated hollow cylinder coupled to said tail pipe and an emissions receiving member effective for captively collecting said portion of said emissions generated by said engine.

3. The improvement in a mobile vehicle defined in claim 2 wherein said elongated hollow cylinder of said collector means is coupled to said tail pipe by a clamping device cooperatively disposed relative to the peripheral surfaces of said hollow cylinder and said tail pipe.

4. The improvement in a mobile vehicle defined in claim 2 wherein said diverter means is a flexible tube coupled to and disposed in communicating relationship with said emissions receiving member of said collector means, said tube being formably coupled also to said frame structure such that said emissions collected by said emissions receiving member are directed onto said endless drive chain.

5. The improvement in a mobile vehicle defined in claim 4 wherein said flexible tube of said diverter means is made of transparent neoprene.

6. The improvement in a mobile vehicle defined in claim 4 wherein said flexible tube of said diverter means is made of pliable metal.

7. The improvement in a mobile vehicle defined in claim 4 wherein said emissions receiving member of said collector means is a collecting elbow secured to a wall of said hollow cylinder and extending outwardly therefrom through an aperture formed therein, an exterior shoulder portion of said collecting elbow being coupled to said flexible tube of said diverter.

8. The improvement in a mobile vehicle defined in claim 4 wherein said emissions receiving member of said collector means is an apertured closure member fixed to the outboard extremity of said elongated hollow cylinder and to which said flexible tube of said diverter means is coupled.

9. In a motorcycle having a frame, at least one driving wheel, a two cycle gasoline engine, a first sprocket operatively connected to said driving wheel, a second sprocket operatively connected to said engine, a drive chain drivably coupling said first and said second sprockets, and an engine exhaust pipe for accommodating the forcible expelling of the combustion emissions generated by said engine, said emissions including a residual of oil from the mixture thereof with the gasoline utilized in the operation of said engine, the improvement comprising:
   a. a collector means communicably coupled to said engine exhaust pipe and effective for captively collecting a portion of said emissions expelled therefrom, and
   b. a diverter means coupled to said collector means and to said frame and effective for directing the captively collected forcibly expelled emissions onto said drive chain such that dirt particles that may have collected thereon are displaced therefrom and the residual of oil forming a part of said emissions is distributed therealong as said chain and said sprockets are drivably rotated by said engine, whereby the operating efficiency of the chain and the sprockets is enhanced and prolonged without requiring that they be regularly cleaned and spray lubricated.

10. The improvement in a motorcycle defined in claim 9 wherein said collector means comprises an elongated hollow cylinder coupled to said engine exhaust pipe and an emissions receiving member effective for captively collecting said portion of said emissions generated by said engine.

11. The improvement in a motorcycle defined in claim 10 wherein said elongated hollow cylinder of said collector means is coupled to said engine exhaust pipe by a clamping device cooperatively disposed relative to the peripheral surfaces of said elongated hollow cylinder and said engine exhaust pipe.

12. The improvement in a motorcycle defined in claim 10 wherein said diverter means is a flexible tube coupled to and disposed in communicating relationship with said emissions receiving member of said collector means, said tube being formably coupled also to said frame such that said emissions collected by said emissions receiving member are directed onto said drive chain.

13. The improvement in a motorcycle defined in claim 12 wherein said flexible tube of said diverter means is made of neoprene.

14. The improvement in a motorcycle defined in claim 12 wherein said flexible tube of said diverter means is made of pliable metal.

15. The improvement in a motorcycle defined in claim 12 wherein said emissions receiving member of said collector means is a collecting elbow secured to a wall of said hollow cylinder and extending outwardly therefrom through an aperture formed therein, an exterior shoulder portion of said collecting elbow being coupled to one end of said flexible tube of said diverter means.

16. The improvement in a motorcycle defined in claim 12 wherein said emissions receiving member of said collector means is an apertured closure member fixed to the outboard extremity of said elongated hollow cylinder and to which said flexible tube of said diverter means is coupled.

17. In a machine having a supporting structure, at least one rotatable output member, a first sprocket associated with said output member, a two cycle gasoline engine for rotating said output member, a second sprocket associated with said engine, an endless drive chain coupling said first sprocket and said second sprocket, and an engine discharge pipe for accommodating the forcible discharging of the combustion emissions generated by the operation of said engine, said emissions including a residual of oil from the mixture thereof with the gasoline utilized in the operation of said engine, the improvement comprising:
   a. a collector means communicably coupled to said engine discharge pipe and effective for captively collecting a portion of said emissions discharged therefrom, and
   b. a diverter means coupled to said collector means and to said supporting structure and effective for directing the captively collected forcibly discharged emissions onto the endless drive chain such that dirt particles that may have collected thereon are displaced therefrom and the residual of oil forming a part of said emissions is distributed therealong as said drive chain and said first and second sprockets are rotated by said engine, whereby the operating efficiency of said drive chain and said first and second sprockets is enhanced and prolonged without regularly and periodically attending to their cleaning and spray lubrication.

18. The improvement in a machine defined in claim 17 wherein said collector means comprises an elongated hollow cylinder coupled to said engine discharge pipe and an emissions receiving member effective for captively collecting said portion of said emissions generated by said engine.

19. The improvement in a machine defined in claim 18 wherein said elongated hollow cylinder of said collector means is coupled to said engine discharge pipe by a clamping device cooperatively disposed relative to the peripheral surfaces of said hollow cylinder and said engine discharge pipe.

20. The improvement in a machine defined in claim 18 wherein said diverter means is a flexible tube coupled to and disposed in communicating relationship with said emissions receiving member of said collector means, said tube being formably coupled also to said supporting structure such that said emissions collected by said emissions receiving member are directed onto said endless drive chain.

21. The improvement in a machine defined in claim 20 wherein said flexible tube of said diverter means is made of neoprene.

22. The improvement in a machine defined in claim 20 wherein said flexible tube of said diverter means is made of pliable metal.

23. The improvement in a machine defined in claim 20 wherein said emissions receiving member of said collector means is a collecting elbow secured to a wall of said hollow cylinder and extending outwardly therefrom through an aperture formed therein, an exterior shoulder portion of said collecting elbow being coupled to said flexible tube of said diverter means.

24. The improvement in a machine defined in claim 20 wherein said emissions receiving member of said collector means is an apertured closure member fixed to the outboard extremity of said elongated hollow cylinder and to which said flexible tube of said diverter means is coupled.

25. The improvement in a machine defined in claim 20 wherein said machine is a motorcycle and wherein said rotatable output member is a driving wheel for transportably activating said motorcycle.

26. The improvement defined in claim 20 wherein said machine is a mobile vehicle and wherein said rotatable output member is a drive wheel for transmitting mobile motion to said vehicle.

* * * * *